(12) United States Patent
Banerjee et al.

(10) Patent No.: US 7,568,030 B2
(45) Date of Patent: Jul. 28, 2009

(54) MONITORING THREAD USAGE TO DYNAMICALLY CONTROL A THREAD POOL

(75) Inventors: Dwip N Banerjee, Austin, TX (US); Kavitha Vittal Murthy Baratakke, Autin, TX (US); Vinit Jain, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/027,044

(22) Filed: Feb. 6, 2008

(65) Prior Publication Data

US 2008/0126539 A1    May 29, 2008

Related U.S. Application Data

(63) Continuation of application No. 10/687,236, filed on Oct. 16, 2003, now Pat. No. 7,363,369.

(51) Int. Cl.
*G06F 13/00* (2006.01)

(52) U.S. Cl. ............... 709/224; 709/226; 709/250; 719/321

(58) Field of Classification Search .......... 709/223, 709/224, 226, 227, 229, 250; 719/318, 321
See application file for complete search history.

(56) References Cited

U.S. PATENT DOCUMENTS

| | | | |
|---|---|---|---|
| 5,761,507 A | 6/1998 | Govett | |
| 5,790,809 A | 8/1998 | Holmes et al. | |
| 5,796,954 A | 8/1998 | Hanif et al. | |
| 6,175,879 B1 * | 1/2001 | Shah et al. | 719/330 |
| 6,240,453 B1 | 5/2001 | Chang et al. | |
| 6,247,161 B1 | 6/2001 | Lambrecht et al. | |
| 6,374,299 B1 | 4/2002 | Ford et al. | |
| 6,393,477 B1 | 5/2002 | Paxhia et al. | |
| 6,542,467 B2 | 4/2003 | Umayabashi et al. | |

(Continued)

OTHER PUBLICATIONS

General Programming Concepts: Writing and Debugging Programs, [online]. 7 pages. [retrieved on Sep. 11, 2003]. Retrieved from the Internet: http://www16.boulder.ibm.com/pseries/en_US/aixprggd/genprogc/understanding_threads.htm.

*Primary Examiner*—Viet Vu
(74) *Attorney, Agent, or Firm*—Matthew W. Baca; Amy J. Pattillo

(57) ABSTRACT

A method, system, and program for monitoring thread usage to dynamically control a thread pool are provided. An application running on the server system invokes a listener thread on a listener socket for receiving client requests at the server system and passing the client requests to one of multiple threads waiting in a thread pool. Additionally, the application sends an ioctl call in blocking mode on the listener thread. A TCP layer within the server system detects the listener thread in blocking mode and monitors a thread count of at least one of a number of incoming requests waiting to be processed and a number of said plurality of threads remaining idle in the thread pool over a sample period. Once the TCP layer detects a thread usage event, the ioctl call is returned indicating the thread usage event with the thread count, such that a number of threads in the thread pool may be dynamically adjusted to handle the thread count.

10 Claims, 5 Drawing Sheets

U.S. PATENT DOCUMENTS

| | | | |
|---|---|---|---|
| 6,651,158 B2 * | 11/2003 | Burns et al. | 712/205 |
| 7,051,337 B2 * | 5/2006 | Srikantan et al. | 719/318 |
| 7,475,124 B2 * | 1/2009 | Jiang et al. | 709/219 |
| 2002/0156897 A1 | 10/2002 | Chintalapati et al. | |
| 2003/0115168 A1 | 6/2003 | Robison | |
| 2004/0003085 A1 * | 1/2004 | Joseph et al. | 709/226 |

* cited by examiner

MONITORING THREAD USAGE TO DYNAMICALLY CONTROL A THREAD POOL

CROSS-REFERENCE TO RELATED APPLICATIONS

This application is a continuation of commonly assigned U.S. patent application Ser. No. 10/687,236, filed Oct. 16, 2003 now U.S. Pat. No. 7,363,369, which is hereby incorporated herein by reference.

BACKGROUND OF THE INVENTION

1. Technical Field

The present invention relates in general to improved network systems and in particular to a method for dynamically controlling the number of active threads in a thread pool waiting for client requests from a network. Still more particularly, the present invention relates to monitoring the number of idle threads or the time requests wait in a queue and returning the monitored counts to a user application periodically, such that the number of threads waiting in a thread pool may be dynamically adjusted to more efficiently manage current loads.

2. Description of the Related Art

The development of computerized information resources, such as interconnection of computer networks, allows users of data processing systems to link with servers within a network to access vast amounts of electronic information. Multiple types of computer networks have been developed that provide different types of security and access and operate at different speeds. For example, the internet, also referred to as an "internetwork", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite of protocols.

Often times, servers accessible via the Internet provide access to applications, web pages, or databases. Further, these web servers, application servers, and database servers often handle multiple requests simultaneously. To handle a heavy load of requests, the operating system handling a server may allocate multiple active threads for each service process provided by the server. Each active thread waits to service a request from one of the multiple clients submitting requests to communicate with the server.

To distribute requests among threads, a listener socket with a listener thread is designated that listens for new requests from clients seeking to communicate with the server. When a new request is detected, the listener socket attempts to hand off the request to one of multiple idle threads. When the thread is handed off, all of the idle threads are "woken up" and one of the idle threads is selected to handle the request. Waking up all of the idle threads each time a request is received uses significant processing resources. For example, if 1000 threads are invoked for a particular process and only 100 are currently servicing requests from clients, the next request will wake up 900 threads and execute 3 system calls for each thread woken up, for only one of those threads to accept and handle the request. Therefore, it is advantageous to limit the number of threads invoked in a thread pool so as to limit the number of idle threads.

By limiting the number of idle threads, however, some requests may not be serviced when received. Requiring clients to wait until a thread is available may lead to unacceptable wait times for processing client requests. For example, if only 100 threads are invoked for a particular process and all are currently servicing requests from clients when 100 more requests on average are received, a request queue that holds waiting requests may be overrun and the time that requests in the queue wait for a thread may be unacceptable. Therefore, it is also advantageous to maintain sufficient idle threads such that wait times are not prohibitive for clients seeking services from a server. Accordingly, it would be advantageous to provide a method, system, and program for monitoring the number of idle threads over a period of time and the number of requests waiting to be serviced over a period of time, such that the number of threads in a pool can be dynamically increased or decreased within a defined range according to the current load needs of the server.

SUMMARY OF THE INVENTION

In view of the foregoing, it is therefore an object of the present invention to provide improved network systems.

It is another object of the present invention to provide a method, system and program for dynamically controlling the number of active threads in a thread pool waiting for client requests from a network.

It is yet another object of the present invention to provide a method, system and program for monitoring the number of idle threads or the time requests wait in a queue and returning the monitored counts to a user application periodically, such that the number of threads in a thread pool may be dynamically adjusted to more efficiently manage current loads.

According to one aspect of the present invention, a server system is communicatively connected to a network. An application running on the server system invokes a listener thread on a listener socket for receiving client requests at the server system and passing the client requests to one of multiple threads waiting in a thread pool. Additionally, the application sends an ioctl call in blocking mode on the listener thread. A TCP layer within the server system detects the listener thread in blocking mode and monitors a thread count of at least one of a number of incoming requests waiting to be processed and a number of said plurality of threads remaining idle in the thread pool over a sample period. Once the TCP layer detects a thread usage event, the ioctl call is returned indicating the thread usage event with the thread count, such that a number of threads in the thread pool may be dynamically adjusted to handle the current thread usage as indicated by the thread count.

According to another aspect of the present invention, a counter is set to monitor the number of incoming requests waiting to be processed over a particular number of TCP slow timer processing cycles. Further, a minimum number of the number of threads remaining idle over the sample period is monitored.

According to yet another aspect of the present invention, the number of active threads in the thread pool is dynamically adjusted according to the thread count to handle a current load. In particular, additional threads may be invoked if the thread count indicates that a number of client requests exceeding a threshold are waiting over a particular number TCP slow timer processing cycles. Additionally, threads may be deactivated if the thread count indicates that a number of threads remained idle over the sample period.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
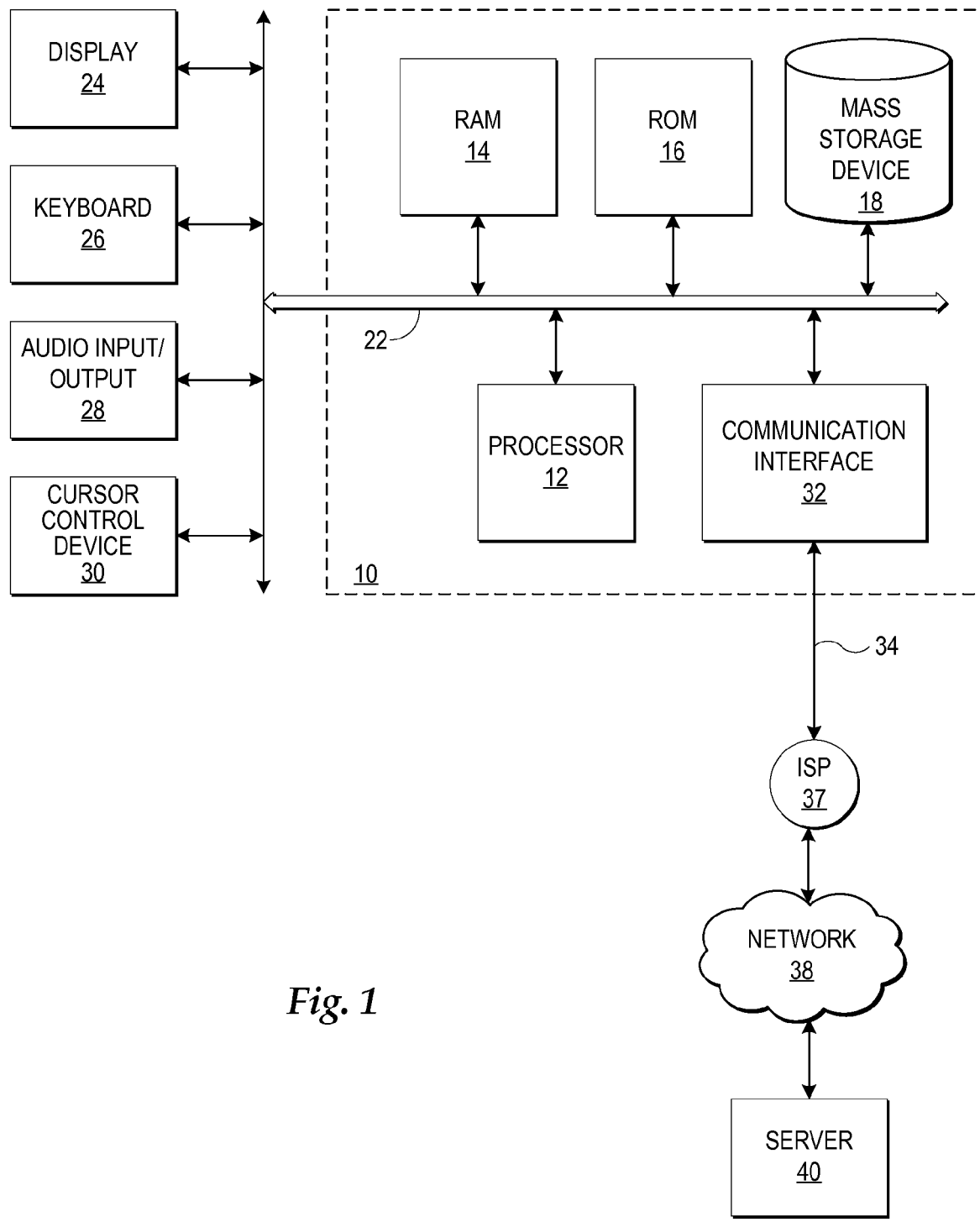
FIG. 1 is a block diagram depicting a computer system in which the present method, system, and program may be implemented.

Referring now to the drawings and in particular to FIG. 1, there is depicted one embodiment of a computer system in which the present method, system, and program may be implemented. The present invention may be executed in a variety of systems, including a variety of computing systems and electronic devices under a number of different operating systems. In general, the present invention is executed in a computer system that performs computing tasks such as manipulating data in storage that is accessible to the computer system. In addition, the computer system includes at least one output device and at least one input device.

Computer system 10 includes a bus 22 or other communication device for communicating information within computer system 10, and at least one processing device such as processor 12, coupled to bus 22 for processing information. Bus 22 preferably includes low-latency and higher latency paths that are connected by bridges and adapters and controlled within computer system 10 by multiple bus controllers. When implemented as a server system, computer system 10 typically includes multiple processors designed to improve network servicing power.

Figure 5:
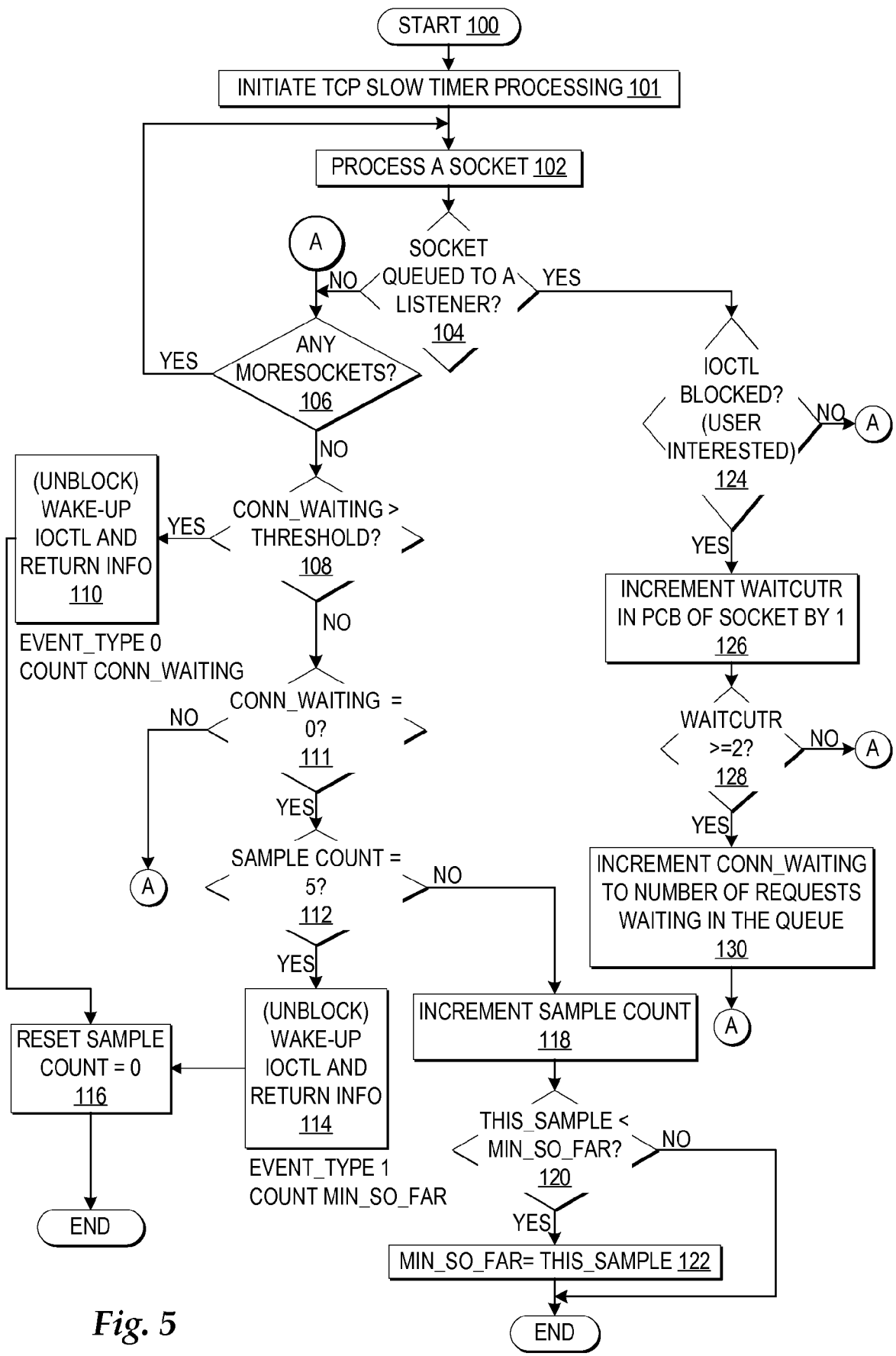
FIG. 5 is a high level logic flowchart of a process and program for monitoring thread usage.

Processor 12 may be a general-purpose processor such as IBM's PowerPC™ processor that, during normal operation, processes data under the control of operating system and application software accessible from a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 5, 6, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is mass storage device 18 which as depicted is an internal component of computer system 10, but will be understood to also be provided by an external device. Volatile media include dynamic memory such as RAM 14. Transmission media include coaxial cables, copper wire or fiber optics, including the wires that comprise bus 22. Transmission media can also take the form of acoustic or light waves, such as those generated during radio frequency or infrared data communications.

Moreover, the present invention may be downloaded as a computer program product, wherein the program instructions may be transferred from a remote computer such as a server 40 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through network 38. Network 38 may refer to the worldwide collection of networks and gateways that use a particular protocol, such as Transmission Control Protocol (TCP) and Internet Protocol (IP), to communicate with one another. ISP 37 and network 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

When implemented as a server system, computer system 10 typically includes multiple communication interfaces accessible via multiple peripheral component interconnect (PCI) bus bridges connected to an input/output controller. In this manner, computer system 10 allows connections to multiple network computers.

Further, multiple peripheral components may be added to computer system 10, connected to multiple controllers, adapters, and expansion slots coupled to one of the multiple levels of bus 22. For example, an audio input/output 28 is connectively enabled on bus 22 for controlling audio input through a microphone or other sound or lip motion capturing device and for controlling audio output through a speaker or other audio projection device. A display 24 is also connectively enabled on bus 22 for providing visual, tactile or other graphical representation formats. A keyboard 26 and cursor control device 30, such as a mouse, trackball, or cursor direction keys, are connectively enabled on bus 22 as interfaces for user inputs to computer system 10. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
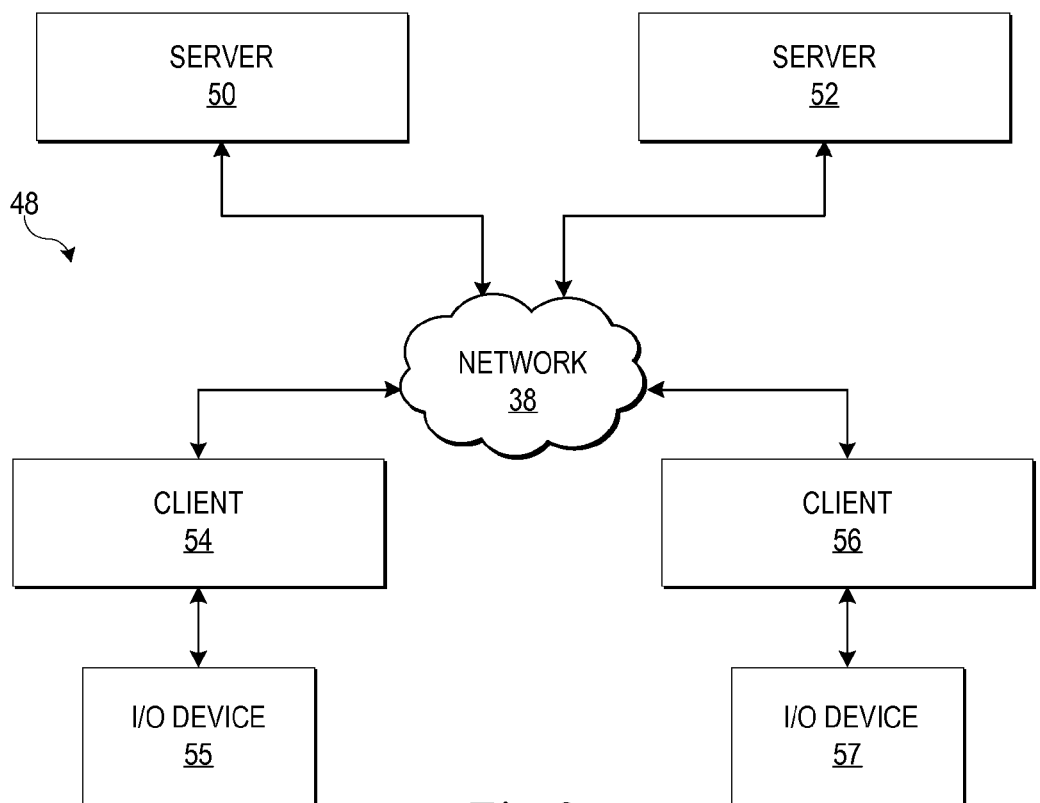
FIG. 2 is a block diagram depicting a distributed network system for facilitating communications between server and client systems.

With reference now to FIG. 2, a block diagram depicts a distributed network system for facilitating communications between server and client systems. Distributed data processing system 48 is a network of computers in which the present invention may be implemented. Distributed data processing system 48 contains a network 38, which is the medium used to provide communications links between various devices and computers connected together within distributed data processing system 48. Network 38 may include permanent connections such as wire or fiber optics cables, temporary connections made through telephone connections and wireless transmission connections.

In the depicted example, servers 50 and 52 are connected to network 38. In addition, clients 54 and 56 are connected to network 38 and provide a user interface through input/output (I/O) devices 55 and 57. Clients 54 and 56 may be, for example, personal computers or network computers. For purposes of this application, a network computer is any computer coupled to a network, which receives a program or other application from another computer coupled to the network.

The client/server environment of distributed data processing system 48 is implemented within many network architectures. For example, the architecture of the World Wide Web (the Web) follows a traditional client/server model environment. The terms "client" and "server" are used to refer to a computer's general role as a requester of data (the client) or provider of data (the server). In the Web environment, web browsers such as Netscape Navigator™ typically reside on client systems 54 and 56 and render Web documents (pages) served by a web server, such as servers 50 and 52. Additionally, each of client systems 54 and 56 and servers 50 and 52 may function as both a "client" and a "server" and may be implemented utilizing a computer system such as computer system 10 of FIG. 1. Further, while the present invention is described with emphasis upon servers 50 and 52 enabling downloads or communications, the present invention may also be performed by client systems 54 and 56 engaged in peer-to-peer network communications and downloading via network 102.

The Web may refer to the total set of interlinked hypertext documents residing on servers all around the world. Network 38, such as the Internet, provides an infrastructure for transmitting these hypertext documents between client systems 54 and 56 and servers 50 and 52. Documents (pages) on the Web may be written in multiple languages, such as Hypertext Markup Language (HTML) or Extensible Markup Language (XML), and identified by Uniform Resource Locators (URLs) that specify the particular web page server from among servers, such as server 50 and pathname by which a file can be accessed, and then transmitted from the particular web page server to an end user utilizing a protocol such as Hypertext Transfer Protocol (HTTP) or file-transfer protocol (FTP). Web pages may further include text, graphic images, movie files, and sounds, as well as Java applets and other small embedded software programs that execute when the user activates them by clicking on a link. In particular, multiple web pages may be linked together to form a web site. The web site is typically accessed through an organizational front web page that provides a directory to searching the rest of the web pages connected to the web site. While network 38 is described with reference to the Internet, network 102 may also operate within an intranet or other available networks.

Servers 50 and 52 may receive multiple communication requests to access the same application or resource from multiple client systems 54 and 56 at the same time. Servers 50 and 52 may service these multiple requests simultaneously by initially invoking multiple threads which wait to accept communication requests. Each client communicates with a server to access an application through a different thread. In the present invention, the number of threads in the thread pool is preferably dynamically adjusted according to the current load of client requests. The current load of client requests is monitored through a monitor thread set to blocking mode. With minimum additional components, the TCP/IP stack returns the current load on the monitor thread over different intervals.

Figure 3:
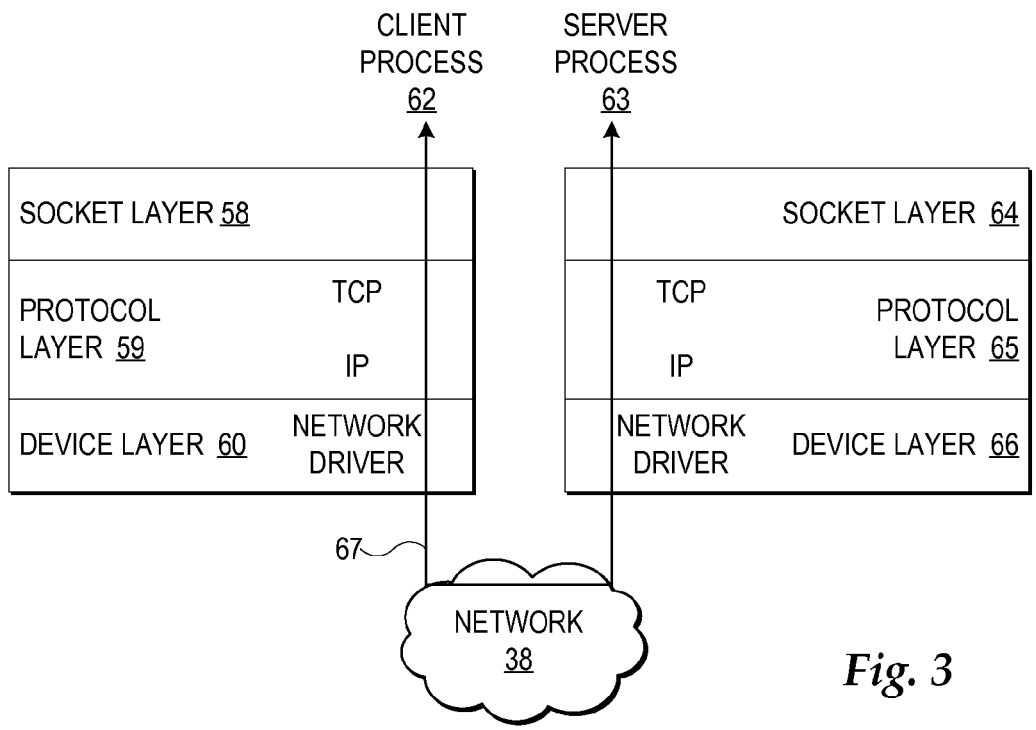
FIG. 3 is a block diagram depicting a socket interface in accordance with the method, system, and program of the present invention.

Referring now to FIG. 3, there is illustrated a block diagram of a socket interface in accordance with the method, system, and program of the present invention. As illustrated, below a client process 62 are located a socket layer 58, a protocol layer 59, and a device layer 60. Similarly, below server process 63 are a socket layer 64, a protocol layer 65, and a device layer 66. Communication link 67 represents the network link that runs between client process 62 and server process 63 through socket layer 58, protocol layer 59, device layer 60, device layer 66, protocol layer 65, and socket layer 64. Along communication link 67 are network drivers in device layers 60 and 66 and TCP/IP in protocol layers 59 and 65.

In the client/server architecture, server process 63 reads from and writes to sockets managed by socket layer 64. Client process 62 communicates with server process 63 via another socket managed by socket layer 58.

A single socket may be opened to handle multiple threads implementing server process 63 for multiple clients. In particular, each socket is assigned a port number. Thus, one socket assigned in socket layer 64 of the server can communicate from multiple threads assigned to the same port number with multiple clients, each assigned a distinguishable IP address and port number. Alternatively, each thread may be assigned to a different socket.

In the present invention, a listener socket is assigned in socket layer 64 with a listener thread that listen for requests from clients. The listener thread hands off requests to worker threads for processing. In addition, for purposes of the present invention, an I/O control (ioctl) call is sent on the listener thread through the listener socket in the blocking mode. Periodically, protocol layer 65 returns the ioctl call with a count of the number of idle threads or the number of client requests waiting for threads in a queue.

Figure 4:
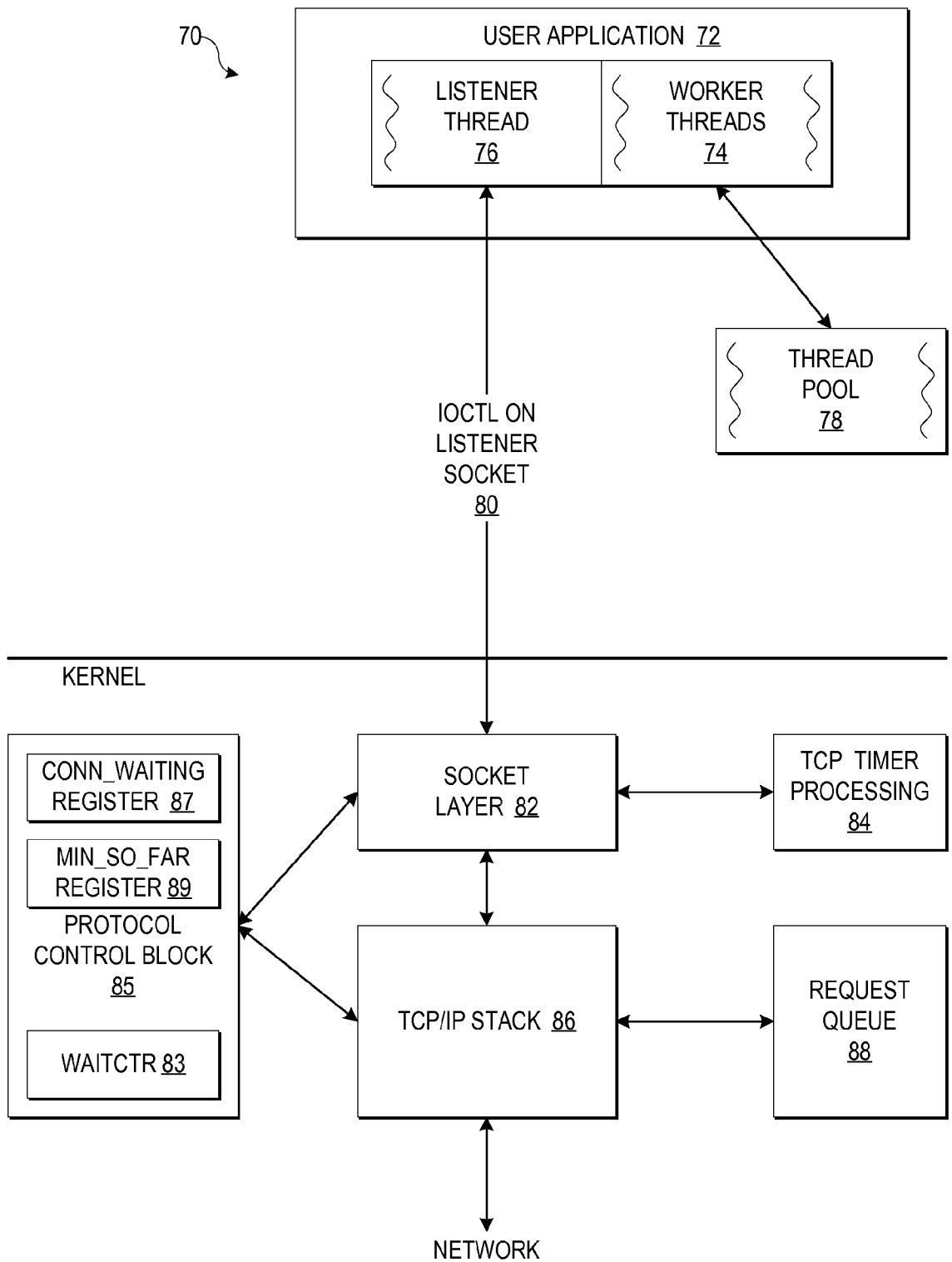
FIG. 4 is a block diagram depicting a server process for dynamically allocating threads in accordance with the method, system, and program of the present invention

With reference now to FIG. 4, there is depicted a block diagram of a server process for dynamically allocating threads in accordance with the method, system, and program of the present invention. As illustrated, a server 70 includes a user application process and a kernel. As depicted, the kernel includes a socket layer 82, a TCP/IP stack 86, a protocol control block (PCB) 85, TCP timer processing 84, and a request queue 88. In addition, other layers, such as a device layer, may be incorporated in the kernel.

User application 72 is typically an application, database, or web page service provided by server 70. Since it is typical for multiple clients to request the service provided by user application 72 of server 70, server 70 manages the requests through listener threads 76 and worker threads 74.

First, server 70 creates multiple threads in a thread pool 78. Threads are independent flows of control that operate within the same address space as other independent flows of control within a process provided by user application 72. Server 70 may initially create a number of waiting threads in thread pool 78 based on previous on previous average usage.

Then, server 70 creates a listener thread 76 on a listener socket 80 by binding at least one thread from thread pool 78 to listen to an IP address port designated in socket layer 82. Listener thread 76 is then set to wait and accept requests from clients. In particular, the listener socket may listen through both a secure port implementing a secure sockets layer (SSL) and a non-secure port within socket layer 82.

Once a request arrives at server 70, listener thread 76 will awaken the idle worker threads in thread pool 78 and pass the request to one of the idle threads which is then designated as one of worker threads 74. Once the listener thread passes off the request, it is set to the accepts mode to listen for the next request. Each worker thread opens a stream connection with a client, reads data from the client, processes client requests, sends a reply to the client, and closes the stream when the client request is terminated. Then, when the connection is closed, the worker thread is returned to thread pool 78.

If thread pool 78 contains no available threads, the server waits until one becomes free. In particular, request queue 88 is set to the listener socket and enables TCP/IP stack 86 to maintain a queue of waiting requests to be processed. The present invention advantageously maintains the number of threads in thread pool 78 to minimize wait times for non-busy threads and minimize the number of threads waiting for work in thread pool 78.

In particular, the present invention maintains the number of threads in thread pool 78 by dynamically adjusting the number of threads based on the number of monitored requests in request queue 88 over a particular period of time. In particular, to indicate that the operating system is interested in monitoring thread usage, listener thread 76 on listener socket 80 is set in the blocking I/O mode. For example, the ioctl( ) call can be used to control the operating characteristics of AF_INET sockets. Using the ioctl( ) call, a socket can be set to either blocking or nonblocking I/O mode. When a socket is set to blocking I/O mode, then the ioctl( ) calling process waits for data, rather than returning an EWOULDBLOCK error code indicating the data is not yet available.

Thus, in the present invention, if a socket is queued to a listener socket and the ioctl( ) call to the socket is in blocking mode, the ioctl( ) call will eventually return an event type and count to the listener thread, such that the number of threads in thread pool 78 can be dynamically adjusted. In the example, the event type is either "0" or "1". An event type of "0" indicates that there are more requests waiting for threads than a threshold set for waiting requests. The count with the event type of "0" indicates the number of waiting requests. An event type of "1" indicates that there are more threads left idle than a threshold set for idle threads. The count with the event type of "1" indicates the number of idle threads. Advantageously, by only returning the event type and count when these values are of interest, minimal processing is used to implement the present invention.

A protocol control block (PCB) 85 within TCP/IP stack 86 maintains a table of the TCP source and destination addresses and port numbers for each connection with server 70. Additionally, PCB 85 maintains entries indicating which ports are open and can be assigned to new requests.

In the present invention, PCB 85 also maintains a counter 83 called "waitctr" which monitors the number of times the TCP slow timer of TCP timer processing 84 has executed when there is a request waiting in request queue 88. For purposes of illustration, once waitctr 83 is greater than or equal to 2, then a register 87 holding the value of "conn_waiting" is incremented to the number of connection requests currently waiting in a request queue 88.

Under TCP timer processing, each socket in use is processed to determine if it is queued to a listener and set to blocking mode. When there are not any more sockets to be processed in a single TCP slow timer cycle, then "conn_waiting" is compared with a threshold value. If "conn_waiting" is greater than the threshold value, then the ioctl( ) call is unblocked and returned with the event type of "0" and the count of "conn_waiting". If "conn_waiting" is equal to zero, then the process continues to process sockets. Otherwise, the number of idle threads is sampled over 5 time cycles. In particular, over the 5 time cycles, the minimum number of idle threads is determined and returned.

For each event type returned, the operating system compares the count with a maximum and minimum threshold number of threads and may dynamically allocate or deallocate threads within thread pool 78. Maximum and minimum numbers may be adjusted over periods of time by sampling the number of threads used, peak usage times, peak processing times, and other With reference now to FIG. 5, there is depicted a high level logic flowchart of a process and program for monitoring thread usage. As illustrated, the process starts at block 100 and thereafter proceeds to block 101. Block 101 depicts initiating the TCP slow timer process. For purposes of this implementation of the invention, the TCP slow timer process occurs every one half of a second. Next, block 102 illustrates performing TCP timer processing on a socket. Thereafter, block 104 depicts a determination whether the socket is queued to a listener socket. If the socket is not queued to a listener, then the process passes to block 106. If the socket is queued to a listener, then the process passes to block 124.

First, if the socket is queued to a listener, block 124 depicts a determination whether the ioctl( ) call is blocked. The ioctl( ) call being blocked is an indication that the user application is interested in monitoring thread usage. If the ioctl( ) call is not blocked, then the process passes to block 106 through indicator "A". If the ioctl( ) call is blocked, then the process passes to block 126. Block 126 illustrates incrementing the wait counter (waitcutr) in the PCB of the socket. Next, block 128 depicts a determination whether the wait counter is greater than or equal to 2. If the wait counter is not greater than or equal to 2, then the process passes to block 106 through indicator "A". If the wait counter is greater than or equal to 2, then the process passes to block 130. Block 130 depicts incrementing the count of the connecting waiting (conn_waiting) variable in the queue, and the process passes to block 106 through indicator "A".

However, when a socket is not queued to a listener, block 106 depicts a determination whether there are any more sockets. If there are more sockets, then the process passes to block 102. If there are not any more sockets, then the process passes to block 108 to determine if the user application should be alerted. In particular, block 108 depicts a determination whether the variable conn_waiting is greater than a threshold value. If the variable conn_waiting is greater than a threshold, then the process passes to block 110. Block 110 depicts waking-up the ioctl( ) call and returning the information about usage. At this point, the event_type is "0", indicating that the queue is busy. The count is the conn_waiting variable which indicates the number of connections waiting during the sampling period. Then, the process passes to block 116, where the sample count is reset and the process ends.

Returning to block 108, if the variable conn_waiting is not greater than the threshold, then the process passes to block 111. Block 111 illustrates a determination whether the conn_waiting variable is equal to zero. If the conn_waiting variable is not equal to zero, then the process returns to block 106 through indicator "A". If the conn_waiting variable is equal to zero, then the process passes to block 112. Block 112 depicts a determination whether the sample count is equal to 5. If the sample count is equal to 5, then the process passes to block 114. Block 114 depicts waking-up the ioctl( ) call and returning the information about usage. At this point, the event_type is "1", indicating that the queue has been empty and threads idle. The count is the number of idle threads during the sampling period. Next, the process passes to block 116, where the sample count is resent, and the process ends.

Returning to block 112, if the sample count is not equal to 5, then the process passes to block 118. Block 118 depicts incrementing the sample count by 1. Next, block 120 illustrates a determination whether this_sample is less than the min_so_far. If this_sample is not less than min_so_far, then the process ends. If this_sample is less than the min_so_far, then the process passes to block 122. Block 122 depicts setting min_so_far equal to this_sample, and the process ends.

Figure 6:
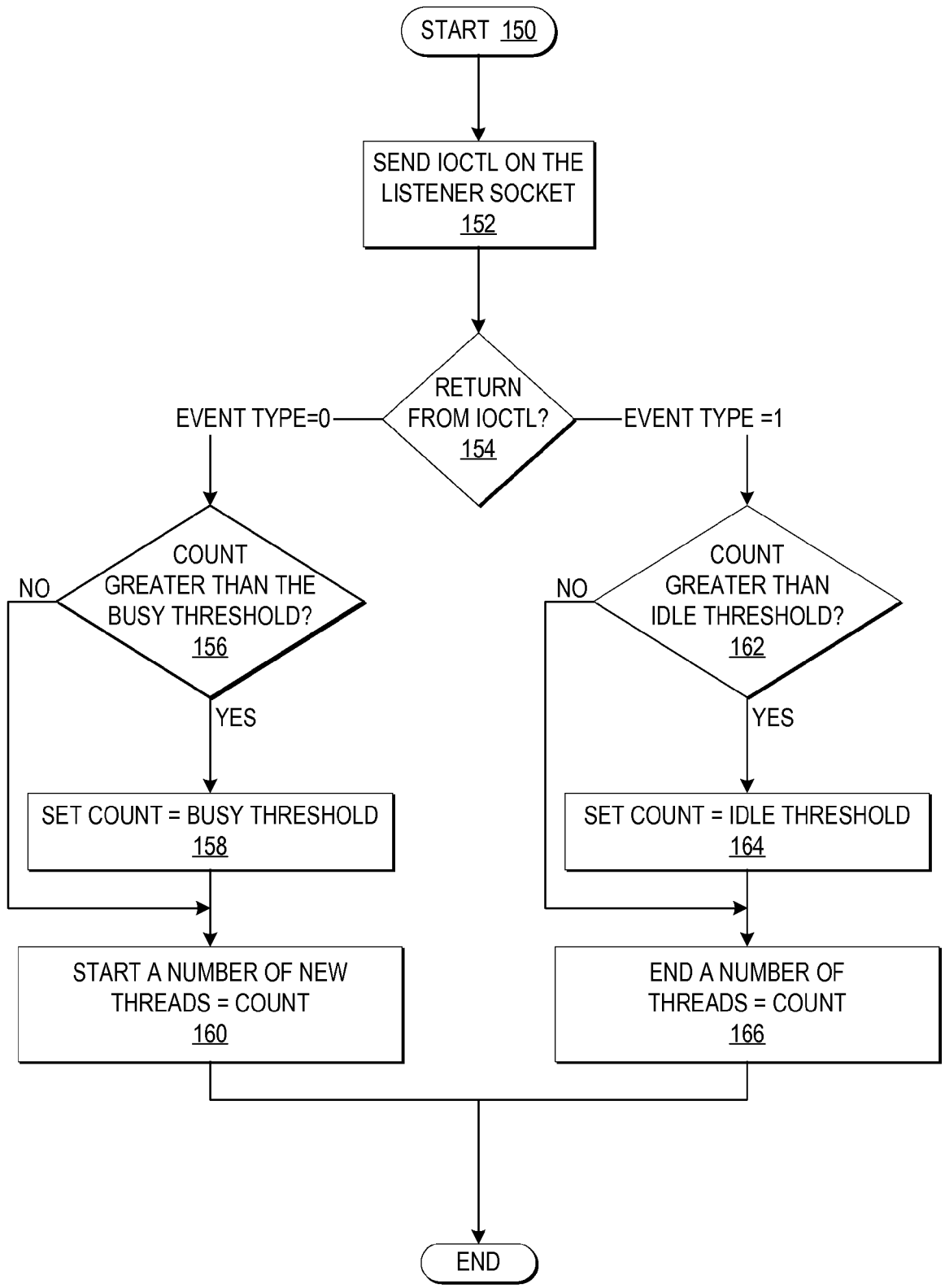
FIG. 6 is a high level logic flowchart of a process and program for dynamically allocating threads according to monitored thread usage.

Referring now to FIG. 6, there is illustrated a high level logic flowchart of a process and program for dynamically allocating threads according to monitored thread usage. As illustrated, the process starts at block 150 and thereafter proceeds to block 152. Block 152 depicts sending the ioctl( ) call on the listener socket in blocking mode. Next, block 154 depicts a determination whether the ioctl( ) call returns. When the ioctl( ) call returns, the process passes to block 156 if event_type is "0" and the process passes to block 162 if event_type is "1".

First, when the event_type is "0", block 156 depicts a determination whether the count returned is greater than a busy threshold. If the count returned is greater than a busy threshold, then the process passes to block 158. Block 158 depicts setting the variable count to the busy threshold value, and the process passes to block 160. If the count returned is not greater than a busy threshold, then the process passes to block 160. Block 160 depicts starting a number of new threads equal to the value of "count", and the process ends.

Alternatively, when the event_type is "1", block 162 depicts a determination whether the count returned is greater than an idle threshold. If the count returned is greater than an idle threshold, then the process passes to block 164. Block 164 depicts setting the variable "count" to the idle threshold value, and the process passes to block 164. Block 164 depicts ending a number of threads equal to the value of "count", and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular types of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A system for monitoring thread usage in a server system, comprising:
   a server system communicatively connected to a network; said server system further comprising:
   a socket designated for listening for incoming client requests to said server system from said network and passing said incoming client requests to one from among a plurality of threads waiting in a thread pool;
   application means for sending an ioctl call in blocking mode on said socket;
   TCP timer processing means for monitoring a thread count of at least one of a number of incoming requests waiting to be processed and a number of said plurality of threads remaining idle in said thread pool over a sample period; and
   TCP layer means for returning said ioctl call back with said count, responsive to detecting a thread usage event.

2. The system according to claim 1 for monitoring thread usage wherein said TCP timer processing means further comprises setting a counter to monitor said number of incoming requests waiting to be processed over a particular number of TCP slow timer processing cycles.

3. The system according to claim 1 for monitoring thread usage wherein said TCP timer processing means further comprises monitoring a minimum number of said number of threads remaining idle over said sample period.

4. The system according to claim 1 for monitoring thread usage, wherein said server system further comprises:
   means for dynamically adjusting a number of active threads in said thread pool according to said thread count to handle a current load.

5. The system according to claim 1 for monitoring thread usage, wherein said server system further comprises:
   means for initiating a TCP slow timer cycle;
   means for processing all of a plurality of sockets during said TCP slow timer cycle;
   means responsive to completing said processing of all of said plurality of sockets, for comparing said thread count with a threshold;
   means responsive to said thread count exceeding said threshold, for designating a thread usage event with said number of incoming requests waiting to be processed; and
   means responsive to said thread count equaling zero after said sample period, for designating a thread usage event with said number of threads remaining idle.

6. A computer program product for monitoring thread usage in a server system, comprising:
   a recording medium;
   means, recorded on said recording medium, for sending an ioctl call in blocking mode on a socket designated for listening for incoming client requests to a server communicatively connected to a network and passing said incoming client requests to one from among a plurality of threads waiting in a thread pool;

means, recorded on said recording medium, for monitoring a thread count of at least one of a number of incoming requests waiting to be processed and a number of said plurality of threads remaining idle in said thread pool over a sample period, responsive to a TCP layer detecting said listen socket in blocking mode; and means, recorded on said recording medium, for returning said ioctl call back with said thread count, responsive to said TCP layer detecting a thread usage event.

7. The computer program product according to claim 6 for monitoring thread usage wherein said means for monitoring a thread count further comprises:

means, recorded on said recording medium, for setting a counter to monitor said number of incoming requests waiting to be processed over a particular number of TCP slow timer processing cycles.

8. The computer program product according to claim 6 for monitoring thread usage wherein said means for monitoring further comprises:

means, recorded on said recording medium, for monitoring a minimum number of said number of threads remaining idle over said sample period.

9. The computer program product according to claim 6 for monitoring thread usage further comprising:

means, recorded on said recording medium, for dynamically adjusting a number of active threads in said thread pool according to said thread count to handle a current load.

10. The computer program product according to claim 6 for monitoring thread usage further comprising:

means, recorded on said recording medium, for initiating a TCP slow timer cycle;

means, recorded on said recording medium, for processing all of a plurality of sockets during said TCP slow timer cycle;

means, recorded on said recording medium, for comparing said thread count with a threshold, responsive to completing said processing of all of said plurality of sockets;

means, recorded on said recording medium, for designating a thread usage event with said number of incoming requests waiting to be processed, responsive to said thread count exceeding said threshold; and means, recorded on said recording medium, for designating a thread usage event with said number of threads remaining idle, responsive to said thread count equaling zero after said sample period.

* * * * *